May 19, 1936.  G. J. PANNECOUCKE  2,041,206
METHOD OF FORMING HANDWHEELS
Filed Sept. 24, 1931
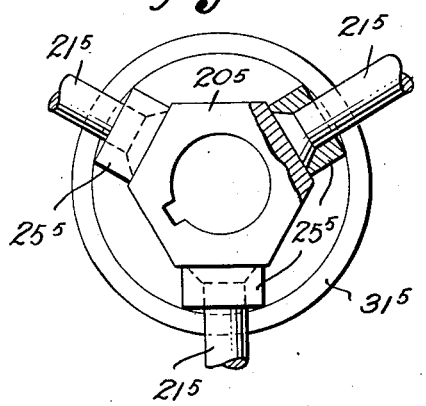
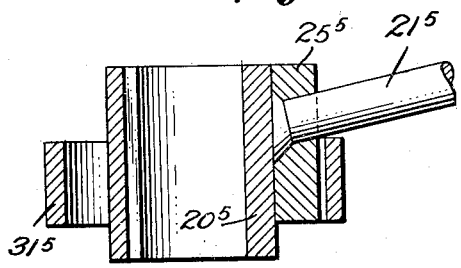
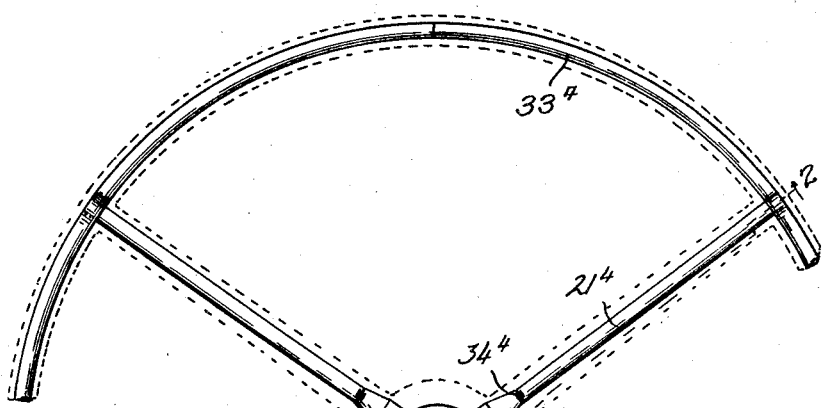
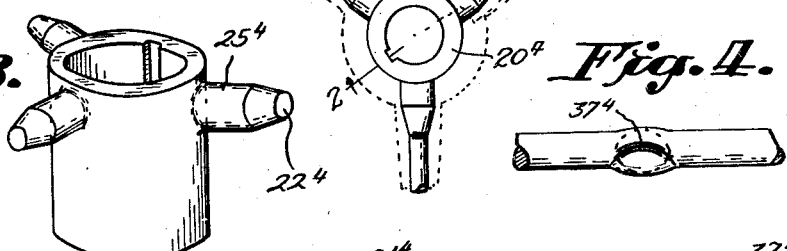
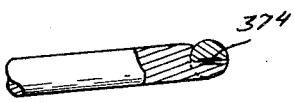
INVENTOR
Gregoire J. Pannecoucke
BY Swan & Frye
ATTORNEYS Patented May 19, 1936

UNITED STATES PATENT OFFICE 2,041,206

METHOD OF FORMING HANDWHEELS

Gregoire Joseph Pannecoucke, Detroit, Mich.

Application September 24, 1931, Serial No. 564,893

1 Claim. (Cl. 29—159)

This invention relates to the construction of reinforced hand wheels, and has for one of its objects provision of improved, simple and rugged hand wheels especially suitable for use as motor vehicle steering wheels.

Another object of this invention is the provision of an improved method of manufacture of wheels of this type whereby the cost of their manufacture and assembly are reduced to an absolute minimum.

Other objects and advantages will be apparent from the following description wherein reference is made to the accompanying drawing illustrating preferred embodiments of my invention, and where similar reference numerals designate similar parts throughout the several views.

In the drawing:

Figure 1 is a plan view, partly broken away, of an improved steering wheel reinforcing frame-work embodying one form of my invention, the subsequently applied molded coating being indicated in dotted lines.

Figure 2 is a sectional view taken substantially on the line 2—2 of Figure 1 and looking in the direction of the arrows.

Figure 3 is a perspective view of the hub member I preferably employ in practicing this form of my invention.

Figure 4 is a fragmentary side elevational view of a portion of the annular rim member of this form of wheel, showing one of the spoke members in end elevation and bringing out the manner of securing the same to the rim member.

Figure 5 is a vertical cross sectional view of somewhat modified hub construction fragmentarily showing a spoke secured thereto.

Figure 6 is a top plan view thereof in which three spokes are fragmentarily shown, part of the hub being broken away to afford a better view of the manner in which the spokes are secured.

Referring now to the drawing: The constructions herein disclosed show means for securing spoke reinforcing members to a hub member, in which arrangements the spokes are disposed with their ends terminally abutting against a portion of the hub, to which they may be secured by welding. The entire assembly is adapted to be thereafter molded into a covering of initially plastic rubber or other suitable composition, for which it forms a reenforcing insert. In the form shown in Figure 1 a cylindrical hub $20^4$ is employed, although one of plain or grooved polygonal contour might equally well be used. Butt welding is employed at its full efficiency to produce a wheel reinforcing structure of great strength, despite the fact that the spokes are secured to the hub only by such welding. As is well known, butt-welding produces an assembly as strong as if the parts joined were one continuous piece, provided the parts so butt-welded are of substantially the same size. Perfect joining of parts by butt-welding cannot be assured if they vary greatly in size, due to the unequal conduction away and dissipation of heat. In order to make possible fully efficient butt-welding of the spokes to the hub I preferably form the hub as shown in Figure 3, casting or forging the same in one piece and providing integral projections $25^4$ the ends $22^4$ of which, to which the spokes are secured, are of substantially the same diameter as the spoke wires $21^4$ so that they may be butt-welded as at $34^4$, and the union to be effected will be as secure as if the spokes and hub were originally integral. By means of special welding apparatus these welds may all be made at once, thus reducing the assembling time to an absolute minimum, and the rim $23^4$ may also be welded to the spoke ends, as at $37^4$, thus producing an assembly which, while of the utmost simplicity and inexpensiveness of construction, is of such strength as to provide a wide margin of safety.

A somewhat modified form of hub construction in which headed spokes $21^5$ are locked in suitably apertured retaining blocks $25^5$, which are welded to the hub $20^5$ as by spot welding, is shown in Figures 5 and 6. For additional security the tightly fitting ring $31^5$ may be driven over the lower ends of the blocks $25^5$, or if desired two such rings may be employed, one above and one below the spokes. The rings may be omitted and welding relied upon entirely to secure the assembly together if desired.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claim.

What I claim is:

The method of forming a metallic reinforcement structure for a hand wheel which comprises drop forging a metallic hub of hollow cylindrical form, simultaneously providing the hub with integral and solid radially extending projections having extremities tapered to reduced diameter, and butt welding to each of the projections a wire spoke member of substantially the same diameter as the reduced extremity of the projection.

GREGOIRE J. PANNECOUCKE.